April 28, 1942.    G. A. WAHLMARK    2,280,875
FLUID PRESSURE GENERATING ACTUATED MEANS
Filed Nov. 22, 1939    6 Sheets-Sheet 1

Fig.1.

INVENTOR.
Gunnar A. Wahlmark,
BY
ATTORNEY.

April 28, 1942. G. A. WAHLMARK 2,280,875
FLUID PRESSURE GENERATING ACTUATED MEANS
Filed Nov. 22, 1939 6 Sheets-Sheet 3

INVENTOR.
Gunnar A. Wahlmark
BY
his ATTORNEY.

April 28, 1942.　　　G. A. WAHLMARK　　　2,280,875

FLUID PRESSURE GENERATING ACTUATED MEANS

Filed Nov. 22, 1939　　　6 Sheets-Sheet 4

INVENTOR.
Gunnar A. Wahlmark,
BY
ATTORNEY.

April 28, 1942. G. A. WAHLMARK 2,280,875
FLUID PRESSURE GENERATING ACTUATED MEANS
Filed Nov. 22, 1939 6 Sheets-Sheet 5

INVENTOR.
Gunnar A. Wahlmark,
BY
his ATTORNEY.

April 28, 1942. G. A. WAHLMARK 2,280,875
FLUID PRESSURE GENERATING ACTUATED MEANS
Filed Nov. 22, 1939 6 Sheets-Sheet 6

INVENTOR.
Gunnar A. Wahlmark,
BY
his ATTORNEY.

Patented Apr. 28, 1942

2,280,875

UNITED STATES PATENT OFFICE 2,280,875

FLUID PRESSURE GENERATING OR ACTUATED MEANS

Gunnar A. Wahlmark, Rockford, Ill.

Application November 22, 1939, Serial No. 305,690

17 Claims. (Cl. 103—162)

The invention relates generally to fluid pressure generating means and, more particularly, to a new and improved fluid pumping unit in which the flow of fluid may be reversed within the pump and which may be adjusted to a zero stroke condition wherein flow of fluid through the pump is prevented.

In the use of hydraulic circuits for recriprocating members, such as tool and work supports in machine tools, it is frequently desirable to utilize a circuit which is always completely filled with fluid. For example, in machines, such as milling machines and planers, wherein the work support is actuated my a piston and cylinder device, high pressure fluid is admitted to one end of the cylinder to move the piston at a relatively slow or cutting speed. In order to prevent the work support from chattering or overrunning, fluid is preferably admitted to the other end of the cylinder under a lower pressure. Reversal of the work support piston is generally obtained by means of a reversing valve which also has a neutral or stop position. Although such a circuit may be completely filled with fluid while it is operating, the work support piston is generally free to move in the cylinder when the control valve is in its stop position.

An important object of this invention is to provide a new and improved fluid pumping unit having a plurality of piston and cylinder devices, means for reciprocating the pistons including means for adjusting the stroke of the pistons and for reversing the sequence of operation of the pistons for reversing the flow of fluid through the pump, the pistons being moved to a zero stroke position to prevent entirely the flow of fluid through the pump. With a pumping unit of this kind, a main control valve for reversing the fluid flow is eliminated and the circuit to which the pump unit is connected remains filled with fluid and "locked" at all times.

Another object is to provide a new and improved fluid mechanism embodying a reversible wobble plate for determining the direction of fluid flow and the rate thereof, and means for placing the wobble plate in an exact neutral or zero stroke position.

Another object is to provide a pumping or motor unit having a plurality of pistons and a reversible wobble plate for actuating the pistons together with a cam control member which is mounted for movement back and forth in one direction for changing the strokes of the pistons from zero to any one of a plurality of different short strokes and which is movable in a transverse direction for changing from such zero or relatively short stroke to a full stroke.

A further object is to provide a pumping unit having a plurality of annularly arranged pistons and actuating means for the pistons, together with stroke adjusting control means of such new and improved construction resulting in a minimum number of joints and permitting preloading of all joints retained.

Yet another object is to provide a pumping or motor unit having a plurality of annularly arranged pistons, a shaft extending concentrically of said pistons, a wobble plate for actuating the pistons having an inner member pivotally mounted upon a pin extending transversely of the shaft, and an outer member rotatably mounted on said inner member without play, the pistons bearing constantly upon the outer member to remove play from the wobble plate and its mounting, and an annular, longitudinally shiftable control member for determining the strokes of the pistons having direct engagement with the outer member of the wobble plate to eliminate the play normally inherent in joints.

Another object is to provide such a pumping or motor unit with means for reversing the wobble plate to reverse the flow of fluid.

Other objects will become readily apparent from the following detailed description taken in connection with the accompanying drawings, in which.

Although there is illustrated in the drawings and herein described in detail a preferred form of the invention, it is to be understood that the invention is not limited to the particular form and arrangement shown, it being contemplated that various changes may be made by those skilled in the art without departing from the spirit and scope of the appended claims.

In the form selected for purposes of disclosure, the invention is embodied in a pumping unit comprising generally a casing 20 in which a drive shaft 21 is rotatably mounted by means of ball bearings 22, 22' and 22" and a roller bearing 23. A plurality of cylinders 24 are arranged annularly about the shaft 21 and contain pistons 25. The pistons are arranged to be reciprocated by means of a wobble plate device 26 generally in the form of a ball bearing having an inner race 27 pivoted to the shaft 21 by means of a pin 28 and an outer race 29 provided with a curved surface 30 which engages the adjacent spherical ends 31 of the pistons 25. The casing 20 has a pair of ports 32 and 33 through which the fluid flows, the flow through these ports and to and from the head ends of the cylinders 24 being controlled by a wheel-like valve member 34 driven by an eccentric 35 on the shaft 21.

Figure 5:
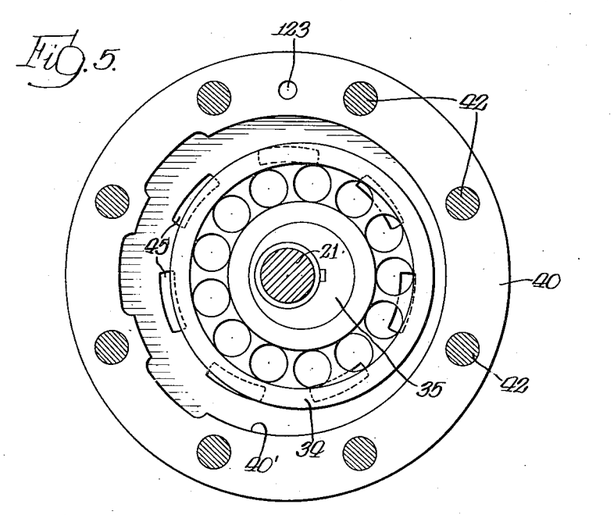
Fig. 5 is a transverse section along the line 5—5 of Fig. 1.

The pump casing 20 is herein made up of a plurality of different parts or sections. Thus a somewhat tubular portion 36 supports the outer races of the shaft bearings 22 and 22' and has an outwardly extending flange 37 at one end provided with bolt holes 37' to facilitate mounting of the unit. The cylinders 24 are formed in a cylinder block 38 which fits within the left hand end of the tubular member 36 and has an outwardly extending flange 39 which abuts the adjacent end of the tubular member 36. Positioned between the cylinder block 38 and an end member 41, in which the fluid ports 32 and 33 are formed, is a ring 40. The parts 36, 38, 40 and 41 are preferably secured together by a plurality of bolts 42 (see Fig. 5). At the extreme left hand end is a cover member 43 secured to the end member 41 by means of a plurality of bolts 44 to complete the casing.

The valve 34 is positioned in a cylindrical chamber 40' formed intermediate the adjacent ends of the cylinder block 38 and the end member 41 and within the ring member 40 and is operable by the eccentric 35 to control the flow of fluid through this valve chamber. Cylinder ports 45 (see Figs. 1 and 5) connect the head end of each cylinder 24 with the valve chamber at points spaced inwardly from the outer wall of the valve chamber. The fluid port 33 (see Fig. 12) connects with passages 46 communicating with the peripheral portion of the valve chamber and fluid port 32 communicates with passages 46' connecting with the inner portion of the valve chamber. This valve construction is more fully disclosed and claimed in my copending application Serial No. 143,069, filed May 17, 1937, on which Letters Patent No. 2,190,812 issued on February 20, 1940.

Figure 1:
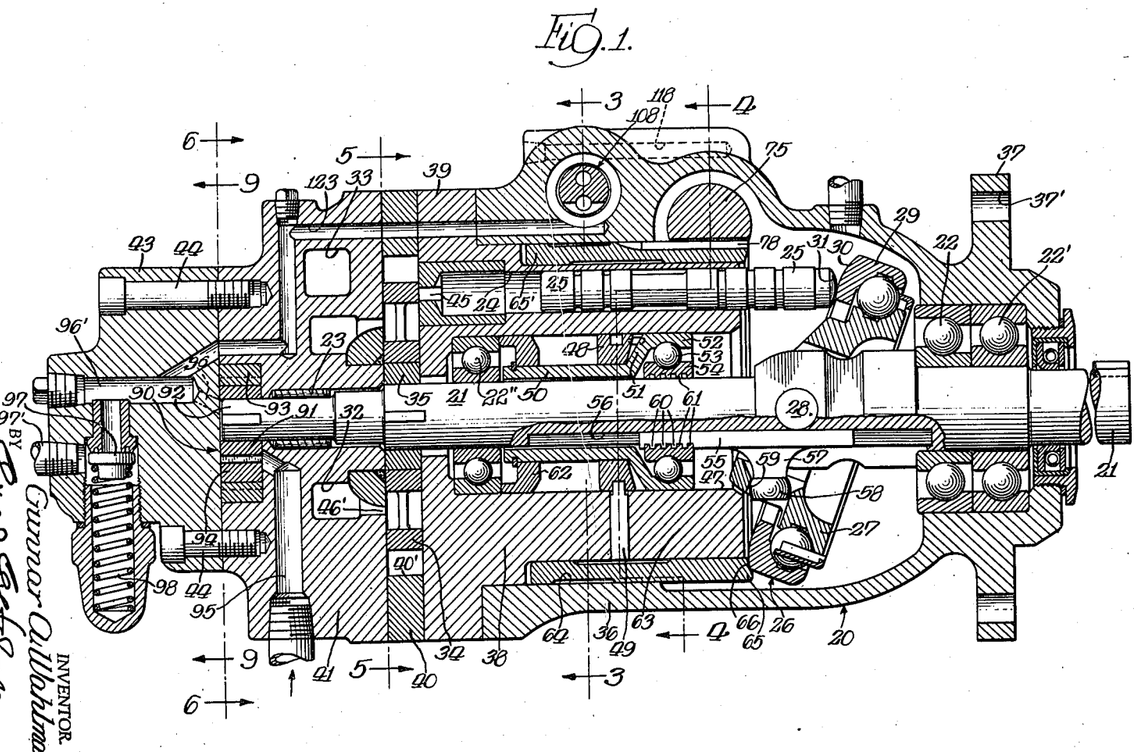
Fig. 1 is a vertical, longitudinal, central section through a preferred form of the invention.

The wobble plate device 26 is reversible in the sense that it may be adjusted about the pivot pin 28 from a maximum stroke position, such as shown in Fig. 1 wherein fluid will flow in one direction through the pump, to a maximum stroke position rotated in a counterclockwise direction from the position of Fig. 1 through the vertical no-stroke or stop position, wherein the flow of fluid will be reversed through the pump. The means for reversing the wobble plate device is herein shown as comprising a piston and cylinder and acts upon the wobble plate inner race member 27. As shown most clearly in Fig. 1, the cylinder block 38 has a central cylinder bore 47 in which a stationary annular piston 48 is secured by means of pins 49. A tubular cylinder 50 is positioned in the bore and surrounding the shaft 21. This cylinder has an integral outwardly extending end wall 51 which connects with a ring 52 forming the outer race of a ball bearing 53, the inner race 54 of which bearing is connected to a bar 55 which is slidable longitudinally on the shaft in a keyway 56 formed therein. The bar 55 has an outwardly extending arm 57 having a spherically surfaced portion 58 engaging in a cylindrical bore 59 in the wobble plate member 27. The bar 55 also has a plurality of teeth 60 which interengage with corresponding teeth 61 formed on the inner race 54. Attached to the other end of the cylinder 50 is an annular member 62 forming the opposite end wall for the cylinder, the outer periphery of this end wall having a sliding fit in the bore 47. It will be readily apparent that by admitting fluid under pressure to the bore 47 on the left hand side of the piston 48, the wobble plate device will be moved to the position shown in Fig. 1, whereas if fluid is admitted to the bore 47 on the right hand side of the stationary piston 48 the wobble plate device will be reversed.

The fluid operated piston and cylinder device just described is effective, if unrestrained, to move the wobble plate device from a maximum stroke in one direction to its maximum stroke in the reverse direction. The invention also contemplates the provision of novel means for obtaining any one of a plurality of relatively short piston strokes and for obtaining a zero stroke position of the wobble plate device. The mechanism for obtaining these various adjustments will now be described.

Figure 2:
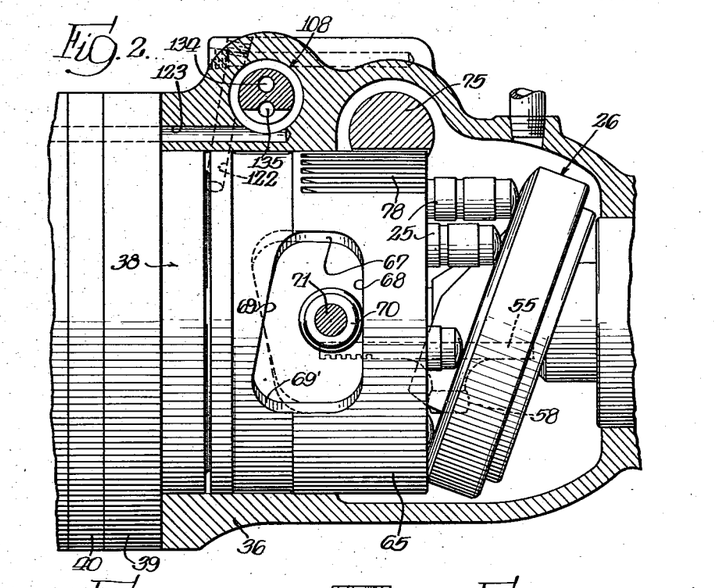
Fig. 2 is a fragmentary view with the casing in section to show the wobble plate and adjusting cam in elevation.
Figure 4:
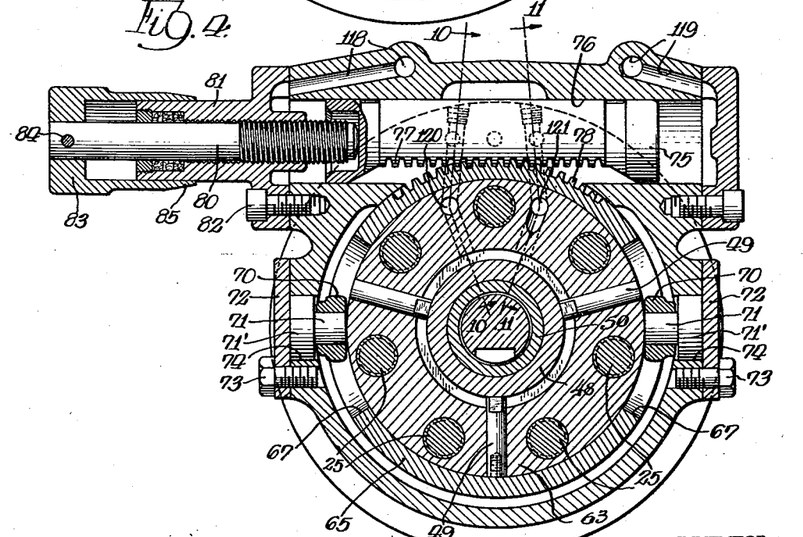
Fig. 4 is a transverse section along the line 4—4 of Fig. 1.

As illustrated in the drawings and, more particularly, in Figs. 1, 2 and 4, the cylinder block 38 is formed with a reduced portion 63 spaced from the adjacent inner surface 64 of the tubular section 36 so as to form an annular chamber therebetween which constitutes a cylinder. A tubular cam control member 65 is slidably fitted in said cylinder so that the left hand end 65' thereof (Fig. 1) constitutes a piston for the cylinder. The tubular cam control member 65 projects out beyond the right hand end of the cylinder block 38 and has an end surface 66 against which the outer race member 29 of the wobble plate device rolls. It is the engagement of the wobble plate member 29 with the end surface 66 of the cam control member 65 which determines the stroke of the pistons. With the cam control member 65 in the position shown in Fig. 1, the pistons are adjusted for maximum stroke. It will be apparent that by moving the cam control member toward the right from the position shown in Fig. 1, the wobble plate device will be pivoted in a counterclockwise direction on the pin 28 in a manner to shorten the piston stroke. This shortening of the piston stroke will continue during movement of the cam control member 65 toward the right until the wobble plate device is in its zero stroke position wherein the outer race member 29 of the wobble plate device engages the end surface 66 of the cam control member throughout its periphery. In this manner an extremely accurate means is provided for determining the zero stroke position of the wobble plate.

In the preferred form of the invention illustrated herein, the cam control member 65 is mounted for reciprocatory movement longitudinally of the shaft 21 in the manner just described and is also mounted for limited rotary movement on an axis concentric with the shaft 21. This cam control member is provided with diametrically opposite openings 67 shaped as illustrated in Figs. 2 and 4. These openings have a straight end wall 68 at the right hand end (see Fig. 2) and an angular end wall 69 at the left hand end. These end walls function as cam surfaces and cooperate with followers consisting of rollers 70 which are mounted on pins 71 secured to the casing member 20 as shown in Fig. 4 by means of plates 72 and bolts 73. The pins 71 are preferably provided with enlarged cylindrical portions 71' fitting snugly in bores 74 in the casing member 20 so as to form rigid supports for the rollers. As illustrated in Figs. 1 and 2, the cam control member 65 is in its extreme left hand position determined by engagement of the straight cam surface 68 with the roller 70. In this position, the wobble plate device is adjusted for maximum piston stroke. By moving the cam control member toward the right until the diagonal cam surface 69 engages the opposite side of the roller, the wobble plate device will be adjusted to a relatively short piston stroke. Although the diagonal cam surface might be extended upwardly in Figs. 2 and 4, a cam surface of the length indicated is generally sufficient to provide a range of slow speeds suitable for moving a work support at a feed rate when the maximum stroke is used for a rapid traverse rate. The cam surface 69 is so formed that when the end 69' thereof is effective to engage the roller, the wobble plate device will be moved to its no-stroke position.

The limited rotary movement of the cam control member 65 is used for obtaining different "short strokes" of the wobble plate device. As illustrated herein, rotary adjustment of the cam control member is obtained by means including a piston 75 (Figs. 1, 2 and 12) which is reciprocable in a cylinder 76 extending transversely in the upper portion of the casing member 20. The intermediate portion of the cylinder 76 is cut away to admit the adjacent portion of the cam control member 65 so that rack teeth 77 formed on the piston 75 can mesh with gear teeth 78 formed on the cam control member 65. When the piston 76 (see Fig. 4) is moved to its extreme right hand position, the cam control member 65 is rotated in a clockwise direction so as to place the extreme end 69' of the cam surface 69 in line to engage the roller 70. Movement of the cam control member 65 to the right (see Figs. 1 and 2) by admission of fluid to the annular chamber formed at the left hand end of the cam control member will, at this time, move the wobble plate device to its no-stroke position. When the piston 75 is in the left hand position shown in Fig. 4, the cam control member 65 is adjusted to the position shown in Fig. 2. When in this angular position, movement of the cam control member longitudinally toward the right will adjust the wobble plate device to provide an intermediate "feed" speed. In order to adjust the "feed" stroke of the pump, an adjustable stop device is provided for the left hand end (see Fig. 4) of the piston 75. This adjustable stop device is herein shown in the form of a screw 80 threaded in a flange bracket 81 secured to the casing member 20 by means of a plurality of bolts 82. A knurled adjusting knob 83 is secured to the end of the screw 80 by means of a pin 84 and is preferably provided with a scale portion 85 which surrounds a part of the bracket 81 to form a speed indicator.

Figure 6:
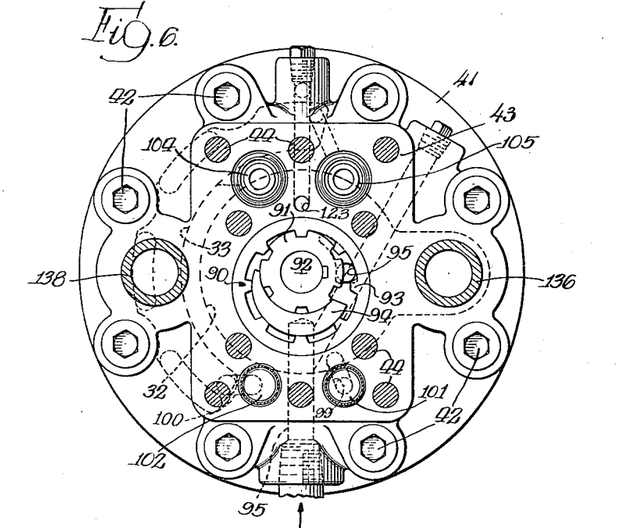
Fig. 6 is a transverse section along the line 6—6 of Fig. 1.
Figure 7:
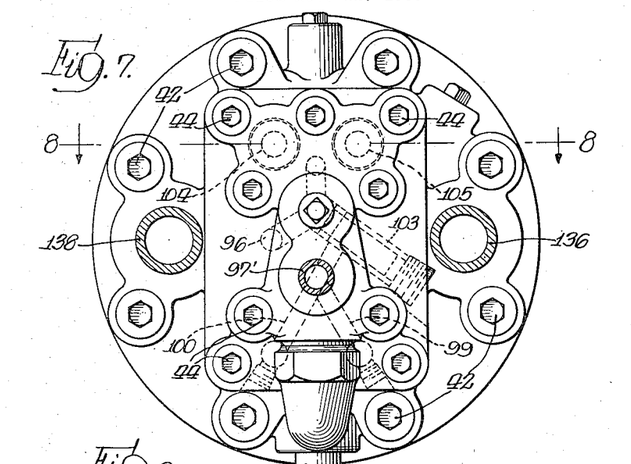
Fig. 7 is an end elevational view taken from the left in Fig. 1.
Figure 9:
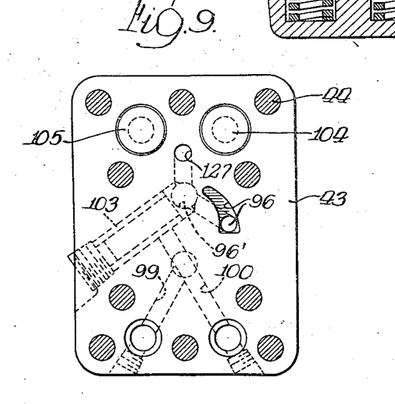
Fig. 9 is a transverse section along the line 9—9 of Fig. 1.
Figure 12:
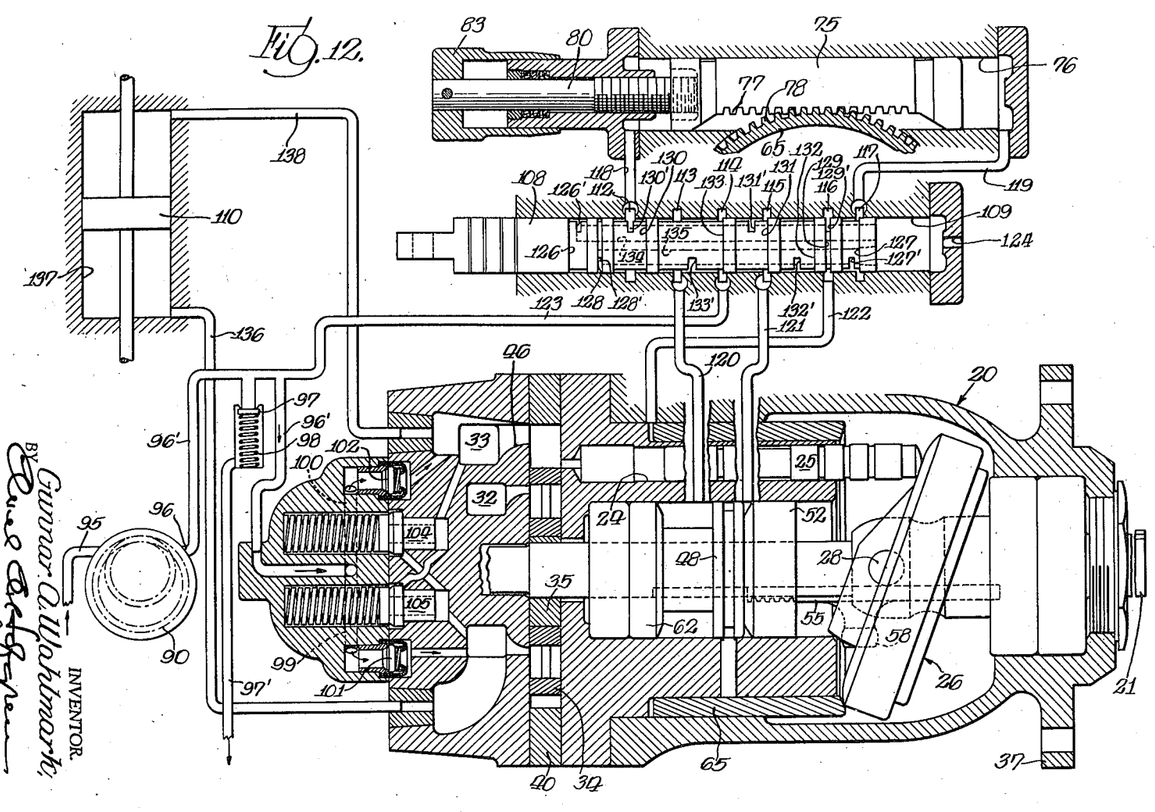
Fig. 12 is a circuit diagram of the fluid pressure generating means of Fig. 1.

Included in the pumping unit illustrated in the drawings is a rotary make-up pump 90 (see Figs. 1, 6 and 12) and certain valve devices (see Figs. 1, 3 and 12) which function to control fluid flow from both pumps and to control the fluid supplied to the control pistons. The make-up pump consists of a toothed roller or pinion 91 keyed to an extension 92 of the pump shaft 21 which projects toward the left beyond the bearing 23 into the left hand end of the casing end member 41. An internally toothed ring or ring gear 93 meshes with the pinion 91, a segmental guard 94 of well known form being positioned intermediate the spaced portions of the roller and ring. When in operation, the make-up pump is arranged to draw fluid from a suitable supply tank (not shown) through an inlet port 95 and to discharge the fluid at a pressure of approximately 125 pounds through an outlet port 96 (see Fig. 9) to a passage 96' formed in the cover member 43. As shown in Figs. 1 and 12, a make-up pump relief valve 97 is provided for by-passing excess make-up fluid back to the supply tank through a conduit 97'. This relief valve is backed up by a coiled spring 98 preferably adjusted to release the valve when the pressure exceeds 125 pounds per square inch.

An important function of the make-up pump is to supply fluid to the piston pump ports 32 and 33 in order to maintain the pump, as well as the circuit to which it is connected, completely full of fluid at all times. This is accomplished by feeding make-up fluid to the pump port which at any particular instant is functioning as the return or suction port to the pump. In order to accomplish this, passages 99 and 100 are provided (see Figs. 9 and 12) communicating at one end with the make-up pump outlet passage 96' and at their other ends respectively with the pump ports 32 and 33. Check valves 101 and 102 are provided in these passages and are arranged to permit flow of make-up fluid into the pump port with which it is associated and to prevent return flow of fluid through the passage. Preferably a strainer 103 (see Fig. 9) is interposed between the passage 96' and the passages 99 and 100.

Figure 8:
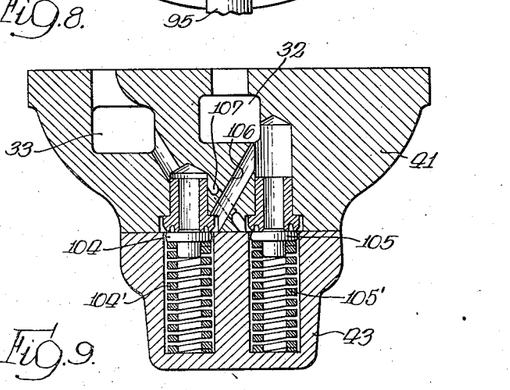
Fig. 8 is a fragmentary section along the line 8—8 of Fig. 7.

In its preferred form, the invention also includes high pressure relief valves for relieving the pressure in the pump port, serving as the outlet port at any particular instance. Several such high pressure relief valves are shown at 104 and 105 in Figs. 8 and 12, and are arranged in a pair of passages 106 and 107 connecting the pump ports 32 and 33. The relief valve 104 is backed by a spring 104' and is arranged to permit flow of fluid from the pump port 33 through the passage 106 to the pump port 32, and to prevent reverse flow. Relief valve 105 is positioned in the passage 107 and is backed by a spring 105' to permit flow of fluid from the pump port 33 to the pump port 32 and to prevent reverse flow.

Figure 3:
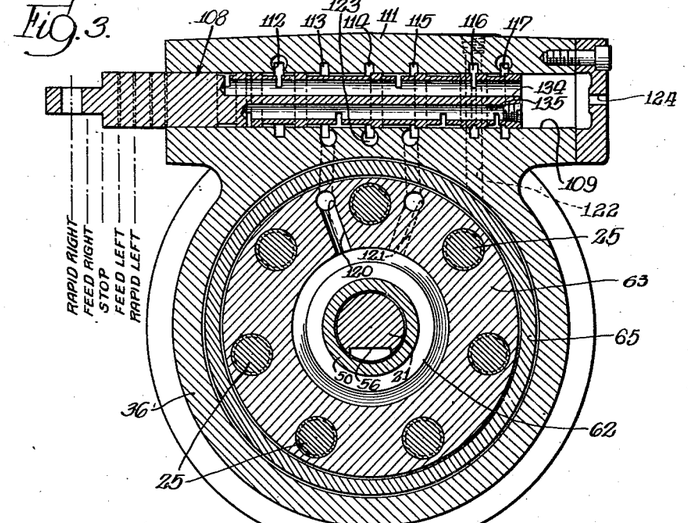
Fig. 3 is a transverse section along the line 3—3 of Fig. 1.
Figure 10:
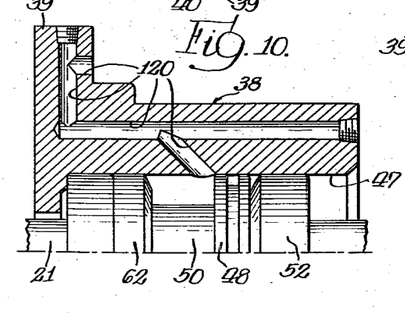
Fig. 10 is a fragmentary section along the line 10—10 of Fig. 4.
Figure 11:
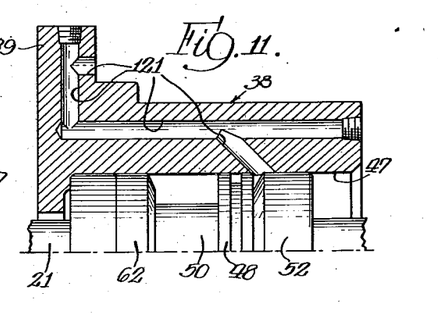
Fig. 11 is a fragmentary section along the line 11—11 of Fig. 4.

Fluid from the make-up pump 90 is also utilized for actuating the reversing piston and cylinder device 48, 50, the cam control member piston 65, and the feed control piston 75. The fluid supplied to these devices is in turn controlled by means of a cylindrical valve 108 mounted for longitudinal movement in a cylindrical bore 109 in the upper portion of the casing member 20 and constructed to have five positions, as shown in Fig. 3, i. e., "rapid right," "feed right," "stop," "feed left," "rapid left." These legends have particular reference to the movement of the work support actuating piston 110 shown diagrammatically in Fig. 12. The valve casing 111 in which the bore 109 is formed is provided with spaced annular grooves 112, 113, 114, 115, 116 and 117 surrounding the bore 109. Groove 112 is connected to the left hand end of cylinder 76 (Fig. 4) by means of a passage 118 (see Figs. 1, 3, 4 and 12), while groove 117 is connected to the right hand end of cylinder 76 by a passage 119. Groove 113 is connected to the left hand side of the stationary piston 48 by a passage 120 (see Figs. 3, 10 and 12), the right hand side of the piston 48 being connected by a passage 121 (see Figs. 3, 11 and 12) to the groove 115. Groove 116 is connected by a passage 122 to the annular chamber in which the control cam 65 reciprocates (see Figs. 2 and 12). The control fluid governed by the valve 108 is supplied through the remaining groove 114 which is connected by a passage 123 to the source of the fluid, namely, the make-up pump 90, the passage 123 actually connecting with the make-up pump outlet passage 96'. The valve casing 111 also has a port 124 leading to the supply tank.

The cylindrical valve 108 is formed with a plurality of alternate grooves and lands so spaced as to cooperate with the grooves in the casing 111 in a manner to effect the desired control of the governing fluid when the valve is in any one of its five positions. More particularly, as best seen in Figs. 3 and 12, the valve 108 is formed with grooves 126 and 127, respectively, near the left and right hand ends of the valve, extremely narrow grooves 128 and 129, respectively, adjacent the grooves 126 and 127, and three grooves 130, 131 and 132 of substantially equal length with the groove 130 separated from the grooves 131 and 132 by a wide groove 133. The grooves 126, 130, 131 and 129 communicate through slot-like ports 126', 130', 131' and 129' with a first passage 134 extending longitudinally of the valve 108 and opening through the right end of the valve to be in constant communication with the tank through the port 124. Grooves 128, 133, 132 and 127 communicate through slot-like ports 128', 133', 132' and 127', respectively, with a second passage 135 extending longitudinally of the valve 108. This second passage, however, is closed at both ends and does not communicate with the port 124 as does the passage 134. The relative position and length of the various grooves will become more definite from the description of the flow of fluid through the valve in its various positions, which will presently be related.

For the purpose of more readily understanding the operation of the fluid pressure generating means, and particularly the flow of control fluid through the valve 108, the operation of the means will be described briefly. For convenience, let it be assumed that the piston 110 of the motor supplied with fluid from the pressure generating means or the support actuated by the piston 110 is to be driven at a traverse rate to the right. Under those conditions, the valve 108 is in its "rapid right" position, namely, the position which the valve assumes in Figs. 3 and 12. With the valve 108 in its "rapid right" position, groove 133 bridges the grooves 113 and 114 and thus control fluid from the make-up pump 90 which is delivered to the groove 114 is supplied to the groove 113 and from the groove 113 through the passage 120 to the left side of the stationary piston 48. The opposite or right side of the piston 48 is now through passage 121, groove 115 of the valve casing, groove 131 of the valve, port 131' and passage 134 in communication with the return port 124. As a result the cylinder 50 is shifted to the left carrying with it the bar 55 and tilting the wobble plate 26 in a clockwise direction, as viewed in Figs. 1, 2 and 12. At the same time the groove 129 registers with the groove 116 and through the port 129' and the passage 134 places the groove 116 in communication with the return port 124. As a result, the fluid pressure in the annular chamber at the left end of the control cam 65 is relieved so that the reaction of the pistons 25 on the wobble plate 26 will cause the same to shift the control cam 65 to the left to the full extent permitted by engagement of the surface 68 with the rollers 70. The pistons 25 now have their maximum stroke and thus discharge the maximum quantity of fluid, and thus there is imparted to the piston 110 and the support actuated thereby a movement to the right at a traverse rate. The fluid at this time is discharged through the pump port 32 to a conduit 136 to the left end of a cylinder 137 in which the piston 110 operates. Fluid from the right end of the cylinder 137 is returned to the port 33 of the pump through a conduit 138. In this "rapid right" position of the valve 108, the right end of the cylinder 76 is also supplied with control fluid since the groove 117 is in communication with the groove 114 through groove 127, port 127' and passage 135. The left end of the cylinder 76 through passage 118, groove 112 in the valve casing, groove 130 of the valve, port 130' and passage 134 is in communication with the return port 124. As a result, the piston 75 is shifted to the left or "feed" position, but under the circumstances such shift is immaterial and plays no part in the adjustment of the pump to "rapid right" position.

Should it be desired to cause the piston 110 to travel to the right at a "feed" rate, the valve 108 is shifted one step to the right, namely, to the position indicated "feed right" in Fig. 3. When the valve is in this position, groove 113 is still in communication with the control fluid supply groove 114 and groove 117 is also still in communication with the groove 114, as previously described. Groove 116, instead of being connected to the return port 124, is now connected with the supply of control fluid through the groove 132, port 132' and passage 135. The left end of the cylinder 76 is still connected to the return port 124 in the manner previously described, and the right side of the stationary piston 48 is also still connected to the return port. As a consequence, the control cam 65 will be shifted to the right to the extent permitted by contact of the inclined surfaces 69 with the rollers 70. Such shift of the control cam 65 to the right causes the wobble plate 26 to assume a smaller angle with respect to the shaft 21 and thus reduces the stroke of the pistons 25 and consequently the volume of fluid discharged by the pump. The final tilt of the wobble plate 26 is, of course, determined by the adjustment of the screw 80 which determines the extent of shift of the piston 75 and the degree of rotation of the control cam 65.

To stop the operation of the piston 110, the valve 108 is shifted another step to the right, namely, to the position indicated as "stop" in Fig. 3. In this position of the valve, control fluid is supplied to the left end of the piston 75 through the passage 135, port 128', groove 128, groove 112 and passage 118, while the right end of the cylinder 76 is now connected to the return port 124 through passage 119, groove 117, groove 129, port 129' and passage 134. The piston 75 is, as a result, shifted to the right, thereby rotating the control cam 65 in a clockwise direction, as viewed in Fig. 4, until the lowermost portions of the surfaces 69 are opposite the rollers 70. Groove 116 through the groove 132, port 132' and passage 135 is also supplied with control fluid, and thus shift of the control cam 65 to the right is effected. Inasmuch as the cam 65 has been rotated to its neutral position, it is shifted until its outer end 66 bears throughout its entire circumference against the wobble plate 26. Such shift of the control cam thus results in an absolutely positive neutral in which there is no movement whatsoever of the pistons 25. In order that this neutral position may be reached from either a right or left adjustment of the pump, both sides of the stationary piston 48 are now connected to the return port 124. The groove 113 is now connected to the port 124 through the groove 130, the port 130' and the passage 134, while the groove 115 is connected to the port 124 through the groove 131, port 131' and passage 134. With the wobble plate at absolute neutral position, there is no displacement of fluid by the pump and hence no movement of the piston 110. Moreover, with this arrangement an absolutely locked circuit is provided holding the piston 110 stationary against movement by the application of external force thereto.

To obtain a "feed left" operation of the piston 110, the valve 108 is shifted still another step to the right to the "feed left" position indicated in Fig. 3. With the valve 108 in that position, the ports and grooves are so positioned that pressure is supplied to the right hand side of the piston 48, to the right hand end of the piston 76, and to the annular chamber at the left end of the control cam 65. At the same time, the left hand end of the cylinder 76 and the left hand side of the piston 48 are connected to the tank. As a result, the piston 75 is again shifted to the left to the extent permitted by the screw 80, while the cylinder 50 is shifted to the right. Shift of the piston 75 rotates the control cam 65 in a counterclockwise direction, and shift of the cylinder 50 rotates the wobble plate 26 in a counterclockwise direction. This shift of the wobble plate 26 is through its neutral position and thus causes the pistons 25 to have a reverse sequence of operation making of the port 33 the discharge port, while the port 32 now becomes the intake or return port. The actual tilt of the wobble plate 26 is again determined by the engagement thereof with the control cam 65, whose position in turn is controlled by engagement of the inclined surfaces 69 with the rollers 70. Fluid is now supplied to the right hand end of the cylinder 137 through the conduit 138 and is returned from the left hand end through conduit 136 to the port 32.

For a movement to the left at a rapid or traverse rate, the valve 108 is shifted to its extreme right position, indicated as "rapid left" in Fig. 3. In this position, fluid is continued to be supplied to the right end of cylinder 76 and to the right side of piston 48, but the annular chamber to the left of the control cam 65 is now connected to the return port 124 inasmuch as the groove 131 now registers with the groove 116. With this relief of pressure fluid at the left end of the control cam 65, the reaction of the pistons 25 on the wobble plate 26, together with the action of the pressure fluid on the cylinder 50, will cause the control cam 65 to be shifted to its extreme left position, as determined by engagement of the straight surfaces 68 with the rollers 70. This again is the maximum tilt of the wobble plate 26 so that the pistons 25 have their maximum stroke. Consequently fluid is discharged at a traverse rate causing the piston 110 to travel to the left at a rapid or traverse rate.

It is to be understood, of course, that in all positions of the valve 108 make-up fluid is being supplied to which ever one of the ports 32 or 33 is acting as an intake port at that particular time. The fluid in excess of that required to make up any deficiency in the main pump circuit and over that required for control purposes is returned to the tank through the relief valve 97 and the conduit 97'. Also it is to be understood that, should the piston 110 or the support actuated thereby become obstructed in its movement, the main pump will be by-passed through high pressure relief valves 104 or 105, these valves being so arranged that such relief may take place regardless of whether the port 32 or the port 33 is functioning as the discharge port at that particular time.

It is believed apparent from the foregoing description that I have provided a unique pumping unit having many advantages both functional and structural. As a result of the particular character of pump structure provided, together with a wobble plate which is so mounted as to effect reversal in the cycle of operation of the pump, the customary reversing valve which is ordinarily connected in the circuit between the pump and the motor is eliminated. By such elimination of the reversing valve, the use of my pumping unit makes possible a closed circuit which is particularly advantageous for machine tool drives. Another feature of my invention is the unique means for adjusting the wobble plate to a positive and exact neutral so as to prevent all discharge of fluid from the pumping unit. This ability to adjust the wobble plate to an exact neutral, coupled with the elimination of the reversing valve, results in the further advantage that when connected in a closed circuit a locked circuit is provided even in the neutral or stop position of the hydraulic system. As stated at the beginning of this specification, normally no locked circuit can be obtained in the neutral or stop position when a reversing valve is employed. With the present construction, however, inasmuch as the valve 34 prevents flow between the ports 32 and 33 except by displacement of the pump, a locked circuit is obtained even in the neutral position.

In addition to the foregoing advantages, my construction has the advantages flowing from the unique and simple arrangement whereby a single control member functions to govern operation of the unit at either a traverse or a feed rate and also adjusts the unit for the particular feed rate of discharge. This unique construction, permitting the use of a single control member for effecting such adjustments of the unit, results in a unit having a minimum number of operating parts while at the same time resulting in adjustments that are accurate and precise and positive. Moreover, this construction permits the hydraulic actuating means for the control member to be formed directly in the pumping unit and this, together with the fact that the hydraulic means for effecting the reversal of the wobble plate and the fact that the make-up pump is also housed in the casing of the pumping unit, permits all control fluid passages and the valve for governing the same to be formed directly in the housing and thus eliminates external conduits which not only render the unit unsightly but are exposed where they are subject to injury.

The construction herein disclosed permits of unusually precise and accurate adjustment, enabling piston strokes of as little as a few thousandths of an inch to be obtained and held with the pump acting against varying pressures imposed by variation in the load. This extreme accuracy is accomplished by elimination of joints in the piston actuating and stroke adjusting mechanism, and a preloading and elimination of play in such joints as remain. To that end, not only is the wobble plate precisely constructed so as to be without play in its mounting on the drive shaft, as well as without play between its parts, but the member for adjusting the position of the wobble plate to determine the stroke of the pistons is made to bear directly and without intervening elements or joints upon the wobble plate. Moreover, this control element not only bears directly upon the wobble plate but also bears upon the same member which bears against the projecting ends of the pistons to impart the stroke to the pistons. With this arrangement, it is readily seen that the stroke adjustment is precisely maintained even with the smallest strokes, for the possibilities for variation in the actuating mechanism are substantially entirely eliminated.

While the invention has herein been described as embodied in a pump, such exemplary embodiment is for purposes of disclosure only and is not to be taken as a dedication of the invention in other embodiments or uses, particularly not as a motor. On the contrary, it is intended to cover embodiment of the invention in a motor which is but a reversal in the use of the invention.

I claim as my invention:

1. A fluid device comprising, in combination, a casing having a plurality of annularly arranged cylinders formed therein, a piston reciprocable in each of said cylinders, a rotatably mounted shaft concentric with said cylinders, a wobble plate mounted for converting rotary motion of said shaft into reciprocatory motion of imparting a discharge stroke to said pistons and vice versa, a pair of fluid ports in said casing for connection of the device to a hydraulic circuit, valve means driven by said shaft for controlling communication between said ports and said cylinders, said wobble plate being adjustably mounted to vary the stroke of said pistons, and a cylindrical member concentric with said shaft and cylinders and having an end edge lying in a plane perpendicular to said shaft adapted to engage said wobble plate, said member being shiftable axially to cause its end edge to bear throughout its circumference against said wobble plate.

2. A fluid device comprising, in combination, a casing having a plurality of annularly arranged cylinders formed therein, a piston reciprocable in each of said cylinders, a rotatably mounted shaft concentric with said cylinders, a wobble plate for converting rotary motion of said shaft into reciprocatory motion of said pistons and vice versa, a pair of fluid ports in said casing for connection of the unit to a hydraulic circuit, valve means driven by said shaft for controlling communication between said ports and said cylinders, said wobble plate being adjustably mounted to vary the stroke of said piston, an annular chamber concentric with said shaft and cylinders, and a cylindrical member reciprocable in said annular chamber, one end of said member forming a piston, the other end of said member projecting outwardly of said chamber for engagement with said wobble plate to determine the tilt thereof and lying in a plane perpendicular to said shaft to adjust said wobble plate to an exact neutral when bearing thereagainst throughout its entire circumference.

3. A pumping unit comprising, in combination, a casing, a rotatably mounted shaft, a plurality of piston and cylinder devices in said casing, a driving member adjustably mounted with respect to said shaft in position to engage one end of said pistons for driving the same through a discharge stroke, a pair of fluid ports in said casing, valve means governing the flow of fluid to and from said cylinders, and a control member governing the position of said driving member to determine the rate of fluid discharge by the pumping unit, said member being movable in one direction to adjust said driving member for a traverse or a feed rate of fluid discharge by the pumping unit and movable in a direction transversely of the first direction of movement for adjusting said driving member to vary the fluid discharge within the feed rate of discharge.

4. A pumping or motor unit comprising, in combination, a body including a cylinder block, a shaft rotatably mounted therein, a plurality of piston and cylinder devices arranged annularly about said shaft in said cylinder block, a wobble plate pivotally mounted on said shaft in position to engage one end of said pistons, and a cylindrical control member mounted on said cylinder block for movement longitudinally thereof and rotationally thereabout, said control member having a peripheral edge disposed in a plane at right angles to said shaft and adapted to engage said wobble plate to determine the tilt thereof, a pair of diametrically oppositely disposed cam slots formed in said control member each having a side edge parallel to said peripheral edge and an opposite side edge inclined to said peripheral edge, a stationary follower disposed in each cam slot and operable to cooperate with the side edges of the cam slot to limit the movement of said control member in its longitudinal shift, said control member being adjusted when the parallel side edge of said cam slot engages said roller to effect a traverse rate of discharge of fluid from the pumping unit and when the inclined side edge engages said roller to effect a feed rate of discharge of fluid from the pumping unit at the specific rate determined by the angular position of said control member.

5. A liquid device comprising, in combination, a casing, a shaft rotatably mounted therein, a plurality of piston and cylinder devices arranged annularly about said shaft, a wobble plate pivotally mounted on said shaft in position to engage one end of said pistons a pair of fluid ports in said casing, valve means governing the flow of fluid to and from said cylinders and through said ports, a control member governing the position of said wobble plate to determine the stroke of the pistons, said member being movable in one direction to adjust said wobble plate for a long or a short piston stroke and movable in a direction transversely of the first direction of movement for adjusting said wobble plate to vary the short stroke adjustment of the pistons a first hydraulic means for controlling the shift of said control member in its first direction, a second hydraulic means for controlling the shift of said control member in its second direction, and a valve for governing the supply of pressure fluid to said hydraulic means.

6. A fluid device comprising, in combination, a body including a cylinder block, a shaft rotatably mounted therein, a plurality of piston and cylinder devices arranged annularly about said shaft in said cylinder block, a wobble plate pivotally mounted on said shaft in position to engage one end of said pistons, a cylindrical control member mounted on said cylinder block for movement longitudinally thereof and rotationally thereabout, said control member having a peripheral edge disposed in a plane at right angles to said shaft and adapted to engage said wobble plate to determine the tilt thereof, a pair of diametrically oppositely disposed cam slots formed in said control member each having a side edge parallel to said peripheral edge and an opposite side edge inclined to said peripheral edge, a stationary follower disposed in each cam slot and operable to cooperate with the side edges of the cam slot to limit the movement of said control member in its longitudinal shift, said control member being adjusted when the parallel side edge of said cam slot engages said roller to effect a long stroke operation of the device and when the inclined side edge engages said roller to effect a short stroke operation of the device at the specific stroke determined by the angular position of said control member, hydraulic means including one end of said member for shifting the same longitudinally, a hydraulic means for rotating said member comprising a piston and cylinder device, said piston having teeth, and teeth on said member meshing with the teeth on said last mentioned piston.

7. A pump or motor device comprising, in combination, a casing, a shaft rotatably mounted therein, a plurality of piston and cylinder devices, adjustable and reversible stroke means carried by said shaft for engaging said pistons, a reversing piston and cylinder device for operating said means, a pair of fluid ports, a valve driven by said shaft for controlling the flow of fluid to and from said cylinders and through said ports, a control cam member movably mounted in said casing, means for moving said cam member back and forth in one direction between a maximum stroke position and a pre-selected shorter stroke position, and means for moving said cam member in a transverse direction for adjusting the stroke means to the pre-selected shorter stroke.

8. A pump or motor device comprising, in combination, a casing having a plurality of annularly arranged cylinders formed therein, a piston reciprocable in each of said cylinders, a shaft rotatably mounted in said casing, a wobble plate pivotally mounted on said shaft, said wobble plate being tiltable to either side of its neutral position, a first hydraulic means for adjusting said wobble plate to one side or the other of its neutral position, a cylindrical control member mounted for longitudinal and rotational movement and having an end edge in a plane perpendicular to the axis of said shaft and adapted to engage said wobble plate to determine the tilt thereof when adjusted to either side of its neutral position, a second hydraulic means including said member shifting the same longitudinally to adjust said wobble plate for operation of the device at a traverse or a feed rate, said control member having means formed therein for varying one rate of operation depending upon the rotational position of said member, and a third hydraulic means for rotating said member.

9. A pumping unit comprising, in combination, a casing, a shaft rotatably mounted therein, a plurality of piston and cylinder devices arranged annularly about said shaft, a wobble plate pivotally mounted on said shaft in position to engage one end of said pistons, a pair of fluid ports in said casing, a valve driven by said shaft for controlling the flow of fluid to and from said cylinders and through said ports, means for reversing said wobble plate comprising a piston and cylinder device, means for determining the position to which the wobble plate is adjusted by said reversing piston and cylinder device comprising a second piston and cylinder device, said second piston being tubular and of a diameter to engage the wobble plate along its peripheral edge, cam slots in said tubular piston cooperable with followers carried on the casing to determine the stroke of said tubular piston, a third piston and cylinder device for oscillating said tubular piston to render different portions of said cam slot effective, means for supplying fluid to said piston and cylinder devices exercising control over said wobble plate comprising an auxiliary pump driven by said shaft and a valve for controlling the flow of fluid from said auxiliary pump to said cylinders of said piston and cylinder devices.

10. A pumping unit comprising, in combination, a casing, a shaft rotatably mounted therein, a plurality of piston and cylinder devices arranged annularly about said shaft, a wobble plate pivotally mounted on said shaft in position to engage one end of said pistons, a pair of fluid ports in said casing, a valve driven by said shaft for controlling the flow of fluid to and from said cylinders and through said ports, means for reversing said wobble plate comprising a piston and cylinder device and means connecting said device to the wobble plate. means for determining the position to which the wobble plate is adjusted by the reversing device comprising a second piston and cylinder device, said second piston being tubular and of a diameter to engage the wobble plate along its peripheral edge, cam slots in said tubular piston cooperable with followers carried on the casing to determine the stroke of said tubular piston, a third piston and cylinder device for oscillating said tubular piston to render different portions of said cam slot effective, means for supplying fluid to said piston and cylinder devices exercising control over said wobble plate comprising a gear type pump driven by said shaft and a valve for controlling the flow of fluid from said pump to said cylinders, a passage connecting said gear pump to each fluid port to supply make-up fluid, and a check valve in each passage permitting flow only from said gear pump to said ports.

11. A pumping unit comprising, in combination, a pump body, a shaft rotatably mounted therein, a plurality of piston and cylinder devices arranged annularly about said shaft, a wobble plate pivotally mounted on said shaft and driven by said shaft to impart a discharge stroke to said pistons, a pair of fluid ports in said casing, a valve driven by said shaft for controlling the flow of fluid between said cylinders and said ports, a first hydraulic control means positioned within said pump body and operable to adjust said wobble plate to opposite sides of neutral position to determine the direction of fluid discharge through said ports, a control member shiftable in one direction for conditioning the unit for discharge of fluid at a feed rate or at a traverse rate and shiftable in a transverse direction for varying the discharge at the feed rate, a second hydraulic means mounted in said pump body operable to effect shift of said control member in one direction, a third hydraulic means operable to effect shift of said control member in a transverse direction, a pump mounted in said pump body and driven by said shaft to supply make-up fluid to said piston and cylinder devices and control fluid for said hydraulic means, a passage leading from said last mentioned pump to each of said fluid ports to supply make-up fluid thereto, a check valve in each passage permitting flow of fluid only from said pump to said port, and a valve mounted in said pump body shiftable to a plurality of positions to govern said plurality of hydraulic means to effect fluid discharge at a feed or a traverse rate in either direction or to have no discharge from the pumping unit, and passages connecting said valve means with said hydraulic means.

12. A pumping unit comprising, in combination, a casing, a shaft rotatably mounted therein, a plurality of piston and cylinder devices, stroke means driven by said shaft for actuating said pistons, said means being adjustable to effect reversal of the fluid discharge from the unit and to vary the quantity of fluid discharge, a first hydraulic means effecting adjustment of said stroke means determining the direction of fluid discharge, a second hydraulic means acting on said stroke means to determine the rate of fluid discharge, and a third hydraulic means to determine the quantity of discharge while operating in one of the selected rates.

13. A pump or motor comprising, in combination, a casing, a shaft rotatably mounted therein, a plurality of piston and cylinder devices arranged annularly about said shaft, a wobble plate comprising an inner member pivotally mounted on said shaft and an outer member rotatable with respect to said inner member and constantly engaging one end of the pistons, and a control member governing the angular position of said wobble plate, said member being annular and mounted concentrically with the plurality of piston and cylinder devices for longitudinal shifting movement and having direct engagement with the outer member of said wobble plate to eliminate play in the adjustment of the stroke of the pistons.

14. In a pumping unit, a casing having a plurality of cylinders formed therein, a piston reciprocable in each of said cylinders, means operatively engaging said pistons to impart a discharge stroke thereto upon relative rotational movement between said casing and said means, said means being adjustably mounted to vary the quantity of fluid discharge from the unit, and annular means against which said first means bears and by which the adjustment thereof is determined.

15. In a pump or motor, a casing having a plurality of annularly arranged cylinders formed therein, a piston reciprocable in each of said cylinders, a wobbler device operatively engaging said pistons, said wobbler device being pivotally mounted to vary the stroke of the pistons, and a cylindrical member concentric with said cylinders and said wobbler device and having an end edge lying in a plane perpendicular to the center line of the pump or motor and engaging said wobbler device in all positions thereof, said member being shiftable longitudinally to determine the angular position of said wobbler device.

16. In a pump or motor, a casing having a plurality of annularly arranged cylinders formed therein, a piston reciprocable in each of said cylinders, a wobbler device operatively engaging said pistons, said wobbler device being adjustable to determine the stroke of the pistons and tiltable to forward and reverse positions on opposite side of its neutral position, a first means for adjusting said wobbler device to one side or the other of its neutral position, and a second means operable independently of said first mentioned means and with said wobbler device on either side of neutral to engage said wobbler device to determine the stroke of the pistons for either forward or reverse adjustment of said wobbler device.

17. A pumping unit comprising, in combination a casing, a shaft rotatably mounted therein, a plurality of piston and cylinder devices, stroke means driven by said shaft for actuating said pistons, said means being adjustable to effect reversal of the fluid discharge from the unit and to vary the quantity of fluid discharge, a first hydraulic means effecting adjustment of said stroke means to determine the direction of fluid discharge, a second means acting on said stroke means independently of said first means to determine the rate of fluid discharge for either direction of discharge of the unit, and a third means to determine the quantity of discharge while operating in one of the selected rates.

GUNNAR A. WAHLMARK.